May 28, 1968 R. J. RORDEN 3,386,049

FREQUENCY CORRECTION CIRCUIT FOR AN AVERAGING FREQUENCY COMBINER

Original Filed Dec. 21, 1966 2 Sheets-Sheet 1

FIG. I

INVENTOR.
ROBERT J. RORDEN

BY Wm J Nolan
ATTORNEY

INVENTOR.
ROBERT J. RORDEN
BY
ATTORNEY

United States Patent Office 3,386,049
Patented May 28, 1968

3,386,049

FREQUENCY CORRECTION CIRCUIT FOR AN AVERAGING FREQUENCY COMBINER

Robert J. Rorden, Los Altos, Calif., assignor to Varian Associates, Palo Alto, Calif., a corporation of California
Original application Dec. 21, 1966, Ser. No. 603,564. Divided and this application Mar. 1, 1967, Ser. No. 619,795
10 Claims. (Cl. 331—2)

ABSTRACT OF THE DISCLOSURE

The signals generated by a plurality of frequency sources are coupled to a common buss. The instantaneous amplitudes of the signals are summed at the common buss to provide a signal whose phase is the average of the phases of the summed signals. The phase averaged signal is amplified, limited and passed through a bandpass filter to provide a signal whose frequency is the average of those of the frequency sources. The phase averaged signal also is coupled to a phase detector associated with each of the frequency sources. Each phase detector compares the phase of the signal generated by the associated frequency source with the phase averaged signal. The phase detector provides a D.C. error signal of a polarity indicating whether the source signal leads or lags the phase averaged signal in phase and of a magnitude proportional to the number of degrees of phase lag or lead. Selected D.C. error signals are coupled to a common error signal averaging buss to provide an average D.C. error signal. The selected D.C. error signals are compared to the average D.C. error signal to provide master error signals representative of the difference between the average D.C. error signal and the compared D.C. error signals. The master error signals and unselected D.C. error signals are coupled to adjust the frequencies of the source signals to the average of their frequencies.

Figure 1:
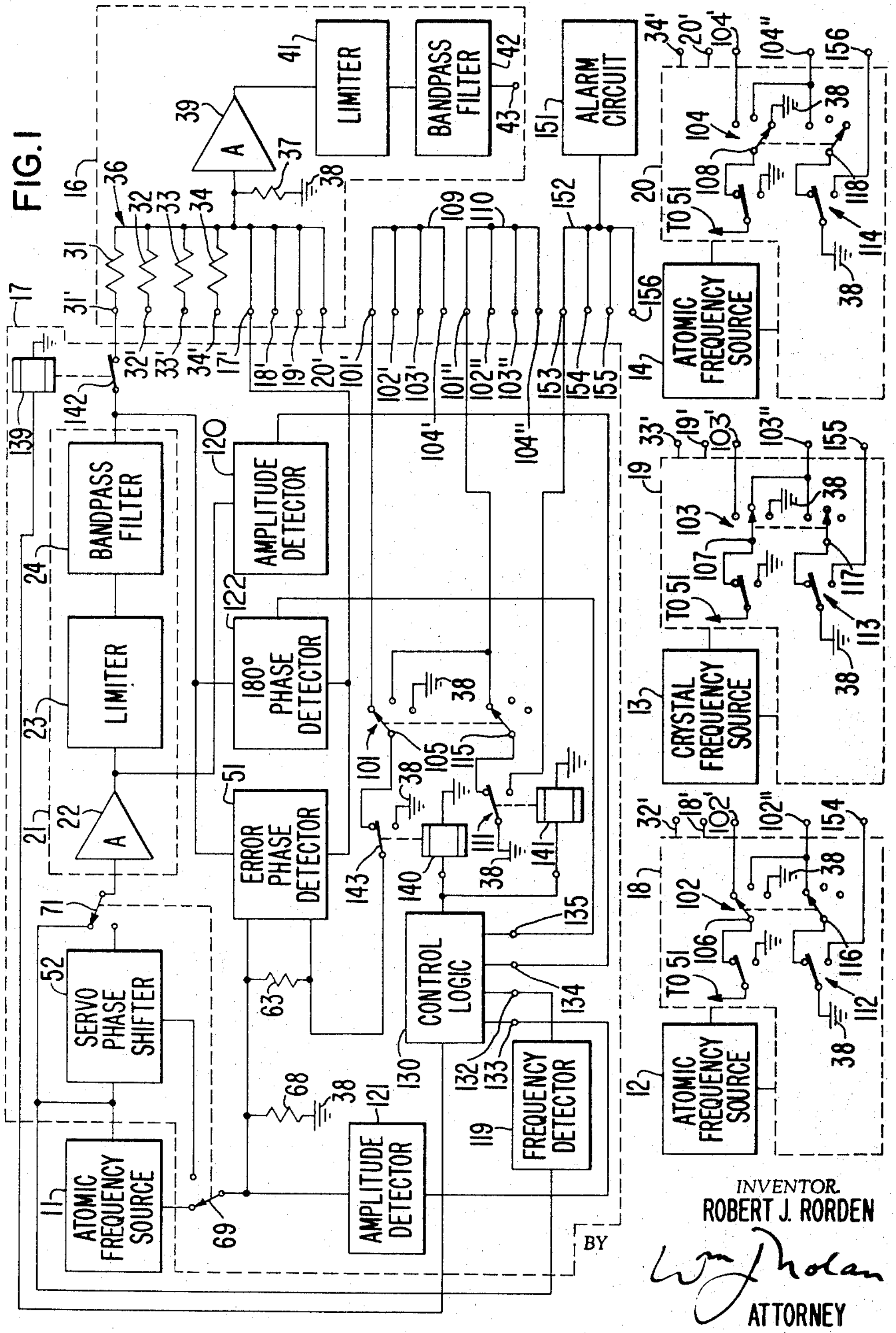

The invention described herein was made in the performance of work under a NASA contract and is subject to the provisions of Section 305 of the National Aeronautics and Space Act of 1958, Public Law 85-568 (72 Stat. 435; 42 USC 2457).

This application is a divisional application of my copending application S.N. 603,564 for an Averaging Frequency Combiner filed Dec. 21, 1966.

The present invention relates to stabilized frequency sources. More particularly, it appertains to a stabilized frequency source which utilizes average frequency combining techniques to provide a signal at a selected frequency with a higher degree of precision than is possible with a single frequency source.

In the astrometrical, astrophysical and astronautical sciences, it is, generally, extremely important to conduct highly precise frequency and time measurements and control, for example, to within parts per $10^{11}$. For such purposes, it is the common practice to employ an atomically stabilized frequency source as a standard. U.S. Patent 3,246,254, issued on Apr. 12, 1966, to W. E. Bell et al., and U.S. Patent 3,159,797 issued on Dec. 1, 1964, to R. M. Whitehorn, both assigned to the assignee of this application, describe typical atomically stabilized frequency sources used as standards. To accomplish such precise measurements, it is necessary that the stabilized frequency standard be accurate and reliable. In most applications, this requires a frequency standard which exhibits both long-term and short-term frequency and phase stability.

Frequency standard systems employing a single frequency source are as accurate and reliable as the single frequency source. Unfortunately, for many applications, the accuracy and reliability quality standard of such systems is poor in comparison to the desired quality standard. For example, frequency standard systems often are employed in space vehicles in their guidance system or in systems carried thereby to conduct experiments in space. Although the probability of errors occurring in such systems may be slight, the fact that such errors are intolerable, because in almost all cases such errors cannot be repaired once the vehicle is in flight, requires that the accuracy and reliability quality standard be much greater than that characteristic of a frequency standard system employing a single frequency source. The same can be said for frequency standard systems incorporated in earth bound systems which operate for extended periods while unattended.

In space vehicle applications, it is the common practice to provide separate back-up or auxiliary systems to enhance the accuracy and reliability quality standard of the overall system. However, such techniques are not completely satisfactory for stabilized frequency standard systems which must be precise to within a few parts per $10^{11}$. This is because the different frequency sources will generate signals at slightly different frequencies and phases. Hence, each time a different frequency source is switched into the frequency standard system, allowances must be made for the inherent difference between the frequencies and phases of the different sources.

Accordingly, it is an object of this invention to provide a stabilized frequency standard system issuing a signal at a selected frequency with a high degree of reliability and accuracy.

More particularly, it is an object of this invention to provide a stabilized frequency standard system having both long-term and short-term frequency and phase stability.

Another object of this invention is to provide a stabilized frequency standard system which minimizes the risk of system malfunction.

A further object of this invention is to provide a stabilized frequency standard system which reliably can provide a signal at a selected frequency over extended periods.

Still another object of this invention is to provide a stabilized frequency standard system employing a plurality of frequency sources each generating a signal which is combined with the other signals to provide a single signal at a selected frequency whereby the system continues to operate uninterruptingly as long as a one frequency source continues to operate.

Yet another object of this invention is to provide a stabilized frequency standard system employing a plurality of frequency sources cooperating to generate a single signal at a selected frequency which automatically corrects frequency and phase deviations of any of the frequency sources.

It is still another object of the present invention to provide a stabilized frequency standard system employing a plurality of frequency sources cooperating to generate a single signal at a selected frequency which automatically disconnects any frequency source from the system in the event of excessive frequency and/or phase deviation of the source.

It is yet another object of the present invention to provide a stabilized frequency standard system employing a plurality of frequency sources cooperating to generate a single signal at a selected frequency which automatically determines if a frequency source should be disconnected from the system because of a malfunction or if a frequency source should be reconnected to the system after correction of the malfunction.

Still a further object of this invention is to provide an extremely reliable and accurate stabilized frequency standard system incorporating atomically stabilized frequency sources and/or non-atomically stabilized frequency sources cooperating to generate precisely a signal at a selected frequency.

Yet a further object of this invention is to provide an extremely reliable and accurate stabilized frequency standard system employing a plurality of frequency sources cooperating to generate a signal at a selected single frequency with at least one frequency source generating a signal at a precisely known stable frequency from which a master signal is derived and used to lock the frequencies and phases of the signals provided by the frequency sources.

According to the present invention, a stabilized frequency standard system is provided which includes features which enable the realization of these and other objects and advantages. More specifically, the stabilized frequency standard system of the present invention includes a plurality of frequency sources each operated to provide a signal at a selected frequency. The signals generated by the sources are coupled to an averaging circuit which provides an output signal representative of the average frequency of the signals of the frequency sources. The signal provided by each frequency source also is coupled to a comparator which receives a signal from the averaging circuit representative of the average frequency of the output signal. The comparator compares the signals to generate error signals representative of any frequency or phase deviation of any of the source signals from that of the output signal. The error signals may be generated by comparing the phases of the source signals and averaged signal. This can be accomplished by comparing the phases directly or comparing their rates of change in phase, i.e., frequency. In any case, the error signals are coupled to adjust the signal issuing from the frequency sources until the frequency or phase deviation of the source signals are eliminated. Such a frequency standard system is characterized by being more precise because the fluctuation on the average of several frequency sources will be less than the fluctuations of any of the individual sources.

In order to construct an extremely precise stabilized frequency standard system, for example, accurate to within parts per $10^{11}$, it is necessary to know the long and short term frequency stability characteristics of the frequency sources employed in the frequency standard system. However, often a frequency source whose frequency stability history is not precisely known must be used in a system, as for example, when a faulty frequency source of a system must be replaced. Furthermore, extremely stable and precise frequency sources are expensive and complex. Hence, many advantages would be gained by providing a frequency standard system which could employ both precisely and less precisely stabilized frequency sources without detrimentally affecting the accuracy and reliability quality standard of the system.

In the frequency standard system of the present invention, such advantages are realized by arranging the sources providing signals at precisely known frequencies, to cooperatively function as a master frequency source to which the frequencies of the signals provided by other less precise sources may be locked. More particularly, the error signals of the precise frequency sources are coupled to a second averaging circuit which provides a reference error signal representative of the average of the error signals of the precise frequency sources. Hence, the reference error signal also represents the average frequency and phase of the signals generated by the precise frequency sources. The error signal of each precise frequency source is compared to the reference error signal to generate a master error signal representative of any frequency or phase deviation of the frequency of the precise source signal from the average of the signals provided by the precise frequency sources. Each master error signal is coupled to adjust the signal of the associated frequency source until the frequency or phase deviation is eliminated. By averaging the error signals, the precise frequency sources will be locked to the average frequency and phase of their signals.

The less precise frequency sources which may be included in the system, do not participate in the error signal averaging.

However, since the precise frequency sources are locked positively to a signal whose frequency is equal to the average of those of the precise frequency sources, the frequency of the signals issuing from the less precise frequency sources will be adjusted towards the average of those of the signals of the precise frequency sources. Without the error signal averaging, the frequency of the output signal of the frequency standard system will tend to follow the less precise frequency sources if any happen to be relatively unstable, i.e., varying more than parts per $10^{11}$.

Figure 2:
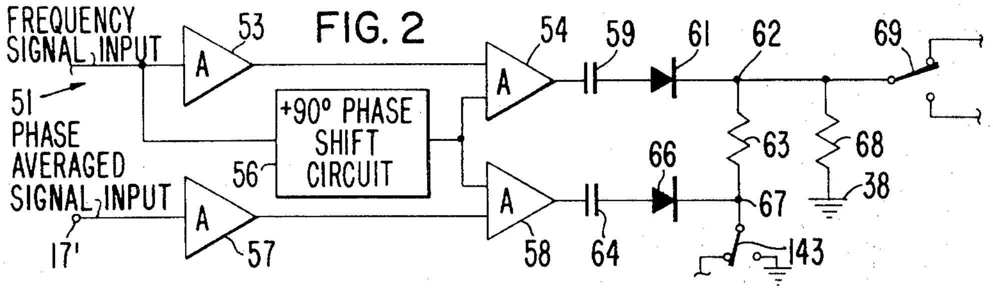
Figure 3:
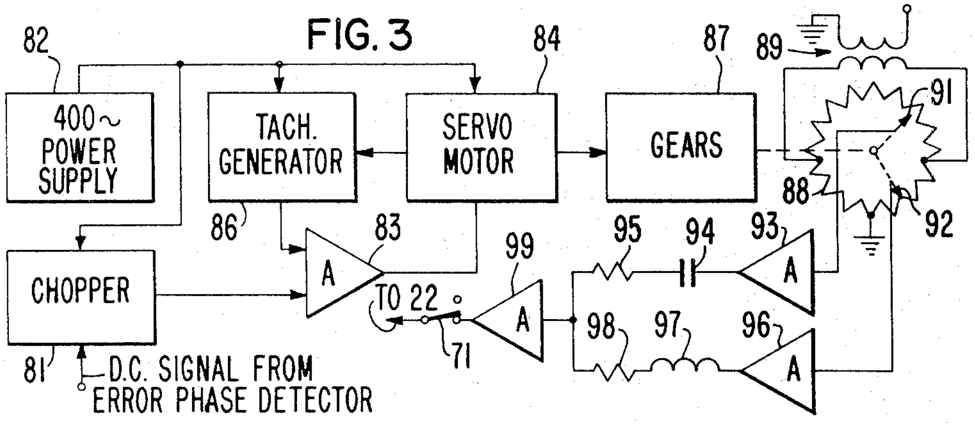
Figure 4:
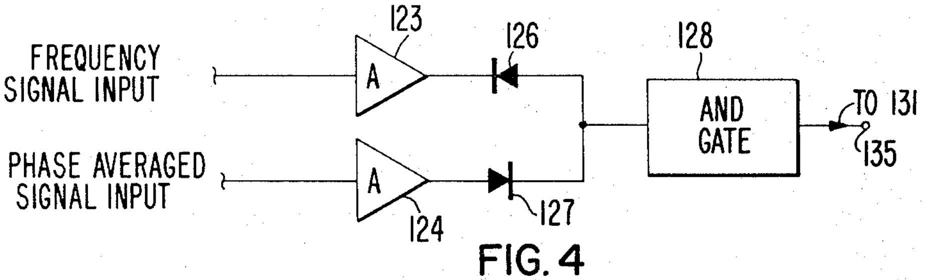
Figure 5:
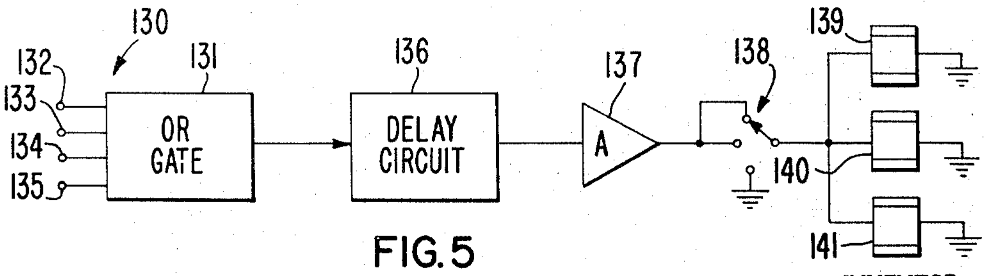

This invention as well as the aforementioned and other objects and advantages will become more apparent from the following detailed description and appended claims considered together with the accompanying drawings in which:

FIG. 1 is a schematic block diagram of one embodiment of the frequency standard system of the present invention, FIG. 2 is a schematic diagram partly in block form of the error phase detector employed in the system of FIG. 1, FIG. 3 is a schematic block diagram of the servo phase shifter employed in the system of FIG. 1, FIG. 4 is a schematic block diagram of 180° phase detector of the malfunction circuit, and FIG. 5 is a schematic block diagram of the malfunction control logic circuit employed in the system of FIG. 1.

Referring to FIG. 1, the frequency standard system of the present invention includes a plurality of frequency sources 11, 12, 13, and 14 coupled to a frequency averaging circuit 16 which provides an output signal at a frequency which is the average of the frequencies of the signals generated by the sources. In one embodiment of the system of the present invention, it is contemplated that both precise and less precise frequency sources will be used. In such a system, the frequency sources 11, 12, and 14 are precise atomically stabilized frequency sources of the type disclosed in the aforementioned patents. As described therein, such frequency sources employ the stimulated emissions of rubidium-87 atoms in a vapor optical absorption cell to lock a voltage controlled crystal oscillator precisely to a selected frequency of, for example, 5 megacycles (mc.). The frequency source 13 is a less precise crystal oscillator, preferably, voltage controlled. Any common voltage controlled crystal oscillator can be employed in the frequency sources, such as, those employing a varicap connected in series or parallel relation with the crystal element to control the frequency of oscillation of the crystal oscillator.

To facilitate generating an output signal precisely at the selected 5 mc. frequency, the plurality of frequency sources 11–14 are adjusted to provide signals at the selected 5 mc. frequency. Of course, a frequency source can be arranged to provide a signal at a frequency which is different from the desired selected frequency. In such cases, a suitable frequency transforming means, e.g., frequency multipliers, dividers and mixers, could be employed so that such frequency sources could provide both desired frequencies. Although under normal operating conditions, the signals will differ a little from one another in frequency and phase, the difference will be very slight, generally, no more than that corresponding to a few degrees in phase angle. Consequently, a simplified phase averaging approximation technique can be employed to accomplish the accurate frequency averaging in the system of the present invention.

More specifically, each of the frequency sources 11–14 is coupled to one of the control modules 17, 18, 19 and 20. Each control module, e.g., that designated by numeral 17, includes a gain control means 21 which receives the 5 mc. signal from source 11 and issues the 5 mc. signal at a selected fixed amplitude. The proper signal amplitude is obtained by first amplifying the 5 mc. signal from source 11 by buffer amplifier 22. The output of the buffer amplifier 22 is coupled to a limiter 23 which responds to provide a fixed amplitude output having a fundamental frequency component equal to 5 mc. The output of the limiter 23 is connected to a bandpass filter 24 which has a passband centered about the desired selected frequency of 5 mc. The filter 24 allows only the 5 mc. fundamental frequency component of the output signal at a fixed amplitude to pass to the frequency averaging circuit 16.

Each of the fixed amplitude 5 mc. signals issuing from the bandpass filters 24 of the control modules 17–20 is coupled to one of the resistors 31, 32, 33 and 34 of the frequency averaging circuit 16 at respective terminals 31', 32', 33' and 34'. The amplitudes of fixed amplitude signals are instantaneously summed and thus the phases instantaneously averaged at the R.F. averaging buss 36 to which all of the resistors 31–34 are connected. Hence, any frequency or phase deviations of the signals issuing from the sources 11–14 will appear as a change in the average signal at the buss 36. The phase averaged signal is developed across a resistor 37 connected between the R.F. averaging buss 36 and ground 38.

For frequency standard purposes, a fixed amplitude output signal at a frequency equal to the average of the signals from sources 11–14 is often desired. In the particular embodiment illustrated, such an output is obtained by first amplifying the phase averaged signal developed across resistor 37 by a buffer amplifier 39. The output of amplifier 39 is coupled to a limiter 41 which provides a fixed amplitude output having a fundamental frequency component equal to the average frequency of the signals. The output of the limiter 41 is coupled to a bandpass filter 42 having a pass band centered about 5 mc. The bandpass filter allows only the fundamental component of the signal from the limiter 41 to pass to the output terminal 43. Although each of the frequency sources 11–14 may provide a signal which deviates from 5 mc. by increments considerably greater than a few parts in $10^{11}$, by combining the signals to obtain the average frequency thereof, the deviation of the average from 5 mc. is considerably reduced.

To automatically lock the output signal to the desired frequency and provide long term frequency stability, each of the signals provided by sources 11–14 is corrected in phase and frequency through a servo loop to match it to the phase averaged signal at the R.F. averaging buss 36. With reference to FIGS. 1 and 2, the frequency and phase locks of each frequency source are accomplished by coupling the phase averaged signal on the R.F. averaging buss 36 to an error phase detector 51 in each of the control modules 17–20. When the frequency of the source signal is less than the fundamental of the phase averaged signal, the phase of the phase averaged signal will lead that of the source signal. Hence, the phase of the phase averaged signal will lag that of the source signal when the frequency of the source signal is greater than the fundamental of the phase averaged signal. Each error phase detector 51 compares the phase of the fixed amplitude source signal with the phase averaged signal and provides a D.C. error signal of a polarity and amplitude proportional to the phase difference between the phase compared signals. As will be explained in more detail hereinbelow, this D.C. error signal is coupled to control the phase of the 5 mc. signal either by electronically tuning the frequency source issuing the compared signal, or by adding phase to the compared signal within the servo phase shifter 52 contained in each of the control modules 17–20.

Each error phase detector 51 includes a first input buffer amplifier 53 which receives the fixed amplitude signal from the bandpass filter 24 and provides a first input to a first differential amplifier 54. The fixed amplitude signal also is coupled to a +90° phase shift circuit 56 which provides a reference phase a signal which always leads the fixed amplitude signal in phase by 90°.

The input of a second buffer amplifier 57 is connected to one of the terminals 17', 18', 19' or 20' of the R.F. averaging buss 36. The amplifier 57 responds to the phase averaged signal on the R.F. averaging buss 36 to provide a first input to a second differential amplifier 58. The output of the +90° phase shift circuit 56 is coupled to the other inputs of the first and second differential amplifiers 54 ad 58. The differential amplifiers 54 and 58 amplify the sum vector of their inputs. The output of differential amplifier 54 is rectified by a half-wave rectifier circuit including capacitor 59 and diode 61. The output of the rectifier circuit is a fixed D.C. voltage equal to the peak of the differential amplifier output and is coupled to the junction 62 of diode 61 and resistor 63. The output of differential amplifier 58 is rectified by a second half-wave rectifier circuit including, capacitor 64 and diode 66. The rectifier circuit provides a D.C. voltage at junction 67 of diode 66 and resistor 63 of a magnitude equal to the peak of the differential amplifier output which is indicative of the amount of phase difference between the phase averaged signal and source signal, and whether the phase averaged signal phase leads or phase lags the source signal. This will become clearer by analyzing the output of amplifier 58 with vector analysis techniques. If the phase averaged signal and the source signal are in phase, the reference phase signal will lead the phase averaged signal by exactly 90°. The output of the differential amplifier 58, which is the resultant of the phase related inputs, will equal the square root of the sum of the squares of the inputs. If the phase averaged signal leads the source signal in phase, the resultant, and hence the output of the differential amplifier 58, will be less than the in phase value by an amount proportional to the phase angle difference. However, if the phase averaged signal lags the source signal in phase, the resultant, and hence the output of the differential amplifier, amplifier 58, will be greater than the in phase value by an amount proportional to the phase angle difference.

To generate the proper error signal, the gains of the amplifiers 53, 54, 57 and 58 are adjusted so that the rectified outputs of the differential amplifiers 54 and 58 are equal when the source signal and phase averaged signal are in phase. Since the output of the second rectifier circuit is equal to the peak value of the output of the differential amplifier 58, in the in phase condition, the outputs of the rectifier circuits at junctions 62 and 67 will be identical. Hence, no current will flow through resistor 63, and no error signal will be developed across resistor 68 connected between junction 62 and ground 38.

If the phase averaged signal lags the source signal in phase, the voltage at junction 67 will become more positive than that at junction 62 by an amount proportional to the number of degrees of phase lag. Hence, a negative error voltage signal will be developed across resistor 68.

If the phase averaged signal leads the source signal in phase, the voltage at junction 67 will become more negative than that at junction 62 by an amount proportional to the number of degrees of phase lead. Hence, a positive error voltage signal will be developed across resistor 68.

As described above, the error phase detector 51 provides an error signal whose polarity indicates whether the source signal leads or lags the phase averaged signal in phase and whose magnitude indicates the number of degrees of phase lead or lag. The error signal is coupled to a switch 69 which directs the error signal to either the frequency source to correct its frequency or to the servo phase shifter 52 to add or substract phase until the frequency and phase of the source signal agree with those of the phase averaged signal on R.F. averaging buss 36.

In the above described error phase detector 51, the source signal was used to generate the reference phase. The phase average signal could be used equally as well to generate the reference phase. Of course, in such an arrangement the signal at junction 67 would remain fixed, while that at junction 62 would change as the phase of the source signal differed from that of the phase average signal.

If the frequency and phase of the signal provided by the source are to be corrected, the switch 69 is placed in the state shown in FIGS. 1 and 2. Where the frequency and phase of each of the atomically stabilized alkali vapor absorption cell frequency sources 11, 12 and 14 are to be adjusted, the error signal associated with each source would be coupled to control the magnetic field bias of the optical absorption cell of the associated source. As is well known, a change in the magnetic field bias causes a slight change in the resonant frequency of the absorption cell. This in turn causes a corresponding shift in the frequency of the controlled oscillator. If the frequency of the crystal controlled frequency source 13 is to be adjusted, the error signal would be coupled to control, for example, the capacitance of a varicap in series or shunt with the frequency determining crystal element. The frequency standard system thus far described with reference to the figures forms part of the subject claimed in my above identified copending application S.N. 603,564.

To correct the source signals so that their respective frequencies and phases agree with those of the phase averaged signal by adding phase to or substracting phase from the source signals, the switch 69 is switched to connect the output of the error phase detector 51 to the input of the servo phase shifter 52. Also switch 71, which is ganged to switch 69, is switched to connect the servo phase shifter 52 serially between the frequency source and buffer amplifier 22 of the gain control means 21. By adding phase to or substracting phase from the signals issuing from the frequency sources, the signals are transformed in phase and frequency until in agreement with those of the phase averaged signal at buss 36.

With reference to FIG. 3, phase is added to or subtracted from the source signal by coupling the error signal to a chopper 81 gated by 400 c.p.s. signal from power supply 82. The output of chopper 81 is a 400 c.p.s. square wave signal whose amplitude and polarity correspond to that of the error signal. The square wave signal is coupled to servo amplifier 83 which provides the suitable driving power to an A.C. servo motor 84. A tachometer generator 86 provides a feedback from the motor 84 to servo amplifier 83 to enhance the response and damping. The motor 84 is coupled to drive a gear train 87 which in turn drives the resolver shaft of the resolver sine-cosine potentiometer 88. The servo loop defined by amplifier 83, motor 84 and tachometer generator 86, and the gear train 87 is assembled and operated so that the rate of rotation of the resolver shaft is proportional to the error signal from the error phase detector 51. When enough phase is added to or substracted from the source signal so that it agrees with that of the phase averaged signal, the rate of rotation of the resolver shaft will be zero, and the resolver shaft will be positioned at a resolver shaft angle, $\theta$, corresponding to the amount of phase required to be added to or subtracted from the source signal.

The 5 mc. signal from the frequency source 11 is coupled to a balanced transformer 89 which provides equal positive and negative voltages on opposite sides of the resolver sine-cosine potentiometer 88. The potentiometer has two sliding taps 91 and 92, mechanically placed 90° apart, which are driven by the resolver shaft. The taps 91 and 92 generate voltages which are electrically in phase for all positions of the potentiometer, have amplitudes which respectively are proportional to the sine and cosine of the angle of rotation, $\theta$ of the resolver shaft, and are positive or negative according to which of the four quadrants the taps contact. To create a 90° electrical phase difference between the sine and cosine voltages, the sine tap 91 is coupled to buffer amplifier 93 and a +45° phase shift circuit including series connected capacitor 94 and resistor 95 to shift the sine voltage by +45°. The cosine tap 92 is coupled to a buffer amplifier 96 and a −45° phase shift circuit including series connected inductor 97 and resistor 98 to shift the cosine voltage by −45°. The phase shifted sine and cosine signals are vector summed by a summation amplifier 99 to provide a resultant signal phase shifted by $\theta$ degrees. The phase shifted sine and cosine signals are summed in the same manner as the phase shifted signals are summed in the error phase detector 51. The output of the summation amplifier 99 is coupled by switch 71 to the gain control means 21.

To enhance the precision of the frequency standard system of the present invention, means are provided to average the outputs of the error phase detectors and correct the frequency sources with respect to the average of the frequencies and phases of the signals generated thereby. However, as noted hereinbefore, where both precise and less precise frequency sources are used, very high precision can be obtained by averaging the error signals of only the most precise atomic frequency sources 11 and 12 while locking the less precise crystal frequency source 13 to follow the average frequency and phase of the signals provided by the precise frequency sources 11 and 12. In one embodiment of the system of the present invention, each of the control modules 17–20 includes one of the double pole, multi-tapped mode selector switches 101, 102, 103 and 104. A first pole 105, 106, 107, and 108 of each of the selector switches 101–104 respectively connects one end of each of the resistors 63 of the error phase detectors 51 through the switch taps to either a master D.C. averaging buss 109 at respective terminals 101′, 102′, 103′, and 104′, the slave D.C. averaging buss 110 at respective terminals 101″, 102″, 103″ and 104″, or ground 38. As shown, the error phase detectors 51 associated with the atomic frequency sources 11 and 12 are coupled to the master buss 109 by switches 101 and 102 respectively. Hence, the serially connected resistors 63 and 68 of each of the error phase detectors 51 are connected in parallel between master buss 109 and ground 38 with those of the other error phase detectors 51. The potential difference between the master buss 109 and ground 38 will be the average of the voltages of the error signals developed across each of the resistors 63 connected to the master buss 109. Therefore, the voltage drop across the resistor 68 of each of the error phase detectors 51 will be equal to the difference between the average voltage of the error signals and the voltage of the error signal developed across the serially connected resistor 63. This voltage drop will be proportional to the difference between the frequency or phase of the source signal and the average of the frequencies and phases of the master source signals. The polarity of the voltage signal will indicate whether the frequency or phase of the source signal is greater or less than the average. In the manner noted hereinbefore, each of these master error voltages signals is coupled to correct the associated master source signal until it is in agreement with the average of the master source signals.

If only one frequency source, for example, atomic frequency source 11, is coupled to the master buss 109, no current path will exist from ground 38 through resistors 63 and 68. Hence, no error signal will develop across resistor 68 and the source itself will determine its frequency output.

The switch 103 of control module 19 is set to couple the error phase detector output controlling the less precise crystal frequency source 13 to the slave D.C. averaging buss 110. Each of the control modules 17–20 includes one of the single pole multi-tapped selector switches 111, 112, 113, and 114. Each of the multi-tapped selector switches 111–114 is ganged to the mode selector switch associated with the common control module. Under normal operating conditions, the multi-tapped selector switches 111–114 connect ground 38 to the slave buss 110 through the second poles 115, 116, 117 and 118 of the double pole selector switches 101–104 when the selector of the switch 101–104 is at the master position. Hence as shown, the slave buss 110 is grounded through those multi-tapped selector switches 111 and 112 contained in the control modules 17 and 18 and set in the master mode for error signal averaging. With the mode selector switch 103 set in the slave mode position, the error signal for correcting the less precise crystal frequency source 13 is not averaged with the error signals generated in the master frequency source control modules 17 and 18. Instead, the error signal generated in control module 19 is coupled directly to adjust the frequency and phase of the crystal frequency source 13 in accordance with the phase averaged signal at the R.F. buss 36. Hence, since the master frequency sources 11 and 12 are positively locked to the average of their frequencies and phases only, the phase averaged signal at R.F. averaging buss 36 will be locked at the frequency and phase corresponding to the average of the master signals. This causes the slave crystal frequency source 13 to be locked at a frequency and phase corresponding to the average of the master signals.

If there are no frequency sources operated in the master mode, the slave D.C. averaging buss 110 will not be grounded through the mode selector switches 101–104. Hence, the slave buss 110 will be floating with respect to ground 38 and thereby function in the same way as the master buss 109 to provide an average of the error signals referenced to the slave buss 110. The mode selector switches 101–104 include self synchronous positions With the mode selector switch 104 in this position, the error phase detector in the control module 20 is connected through the first pole 108 of switch 104 to ground 38. Hence, the frequency source 14 will be corrected in accordance with the phase averaged signal at the R.F. buss 36. Since the error signal generated in the control module 20 associated with the frequency source 14 is not referenced to neither the master buss 109 nor the slave buss 110, the error signal generated therein will never participate in the error signal averaging process. The self synchronized mode selector switch position will be used, for example, when the long term frequency stability characteristic of atomic or crystal frequency sources is unknown.

To insure the generation of a precise 5 mc. output signal, means are provided to detect a variety of malfunctions of any of the frequency sources 11–14, and disconnect the malfunctioning sources from the frequency standard system. Furthermore, means are provided to re-connect such sources when the malfunctioning has been corrected. Specifically, each of the control modules 17–20 includes a malfunction system comprising a frequency detector 119, which monitors the frequency of the source signal generated by the source and provides a first malfunction voltage signal when the frequency deviates more than a selected amount from 5 mc. indicating an unlocked condition. The malfunction system also includes an amplitude detector 120 coupled to the output of buffer amplifier 22 and provides a second malfunction voltage signal when there is a failure of the amplitude of the 5 mc. signal. An amplitude detector 121 also is coupled to monitor the error signal issuing from the error phase detector 51. This amplitude detector 121 provides a third malfunction voltage signal when the amplitude of the error signal is larger than a selected limit indicating too large of a frequency or phase error in the source signal provided by the source. Since an in phase condition would appear to exit when the source signal and the phase averaged signal were actually 180° out of phase, the malfunction system further includes an 180° phase detector 122. With reference to FIG. 4, the source signal is coupled to a first amplifier 123 and the phase averaged signal is coupled to a second amplifier 124. The outputs of the amplifiers 123 and 124 are connected to opposite poles of the diode rectifiers 126 and 127 respectively. Each of the diode rectifiers 126 and 127 are connected in series between their associated amplifier and the input to "AND" gate 128. When the source signal is 180° out of phase with the phase averaged signal, the rectified outputs of both the diode rectifiers 126 and 127 are present at and causes "AND" gate 128 to conduct and provide a fourth malfunction signal. These four malfunction signals are coupled to the control logic 130 which determines if the frequency source is to remain in or be disconnected from the system.

More specifically, with reference to both FIGS. 1 and 5, the control logic 130 includes an "OR" gate 131 having input terminals 132, 133, 134 and 135, each receiving one of the malfunction signals. When any malfunction signal is present at the input terminals of the "OR" gate 131, the "OR" gate responds by generating an output signal. The output signal is coupled through a delay circuit 136 to the input of an amplifier 137. The delay circuit 136 provides a delay, for example, of twelve seconds, to prevent any transient occurrences from initiating a disconnection or a reconnection of a frequency source and the system. The output of the amplifier 137 is coupled through a multi-tapped selector switch 138 to relay coils 139, 140 and 141.

The selector switch 138 contained in control module 17–20 is ganged to the one of the mode selector switches 101–104 contained in the common control module. The selector switch couples the output of amplifier 137 to the relay coils 139–141 when the associated mode selector switch is in the master and slave positions. When the associated mode selector switch is in the self synchronous position, the switch 138 disconnects the relay coils 139–141 from the control logic 130 of the malfunction system.

Under normal operating conditions, amplifier 137, providing an emitter follower output, is conducting and relay coils 139–141 are activated. When a malfunction occurs, "OR" gate 131 provides a pulse which gates amplifier 137 off. This deactivates the relay coils 139–141. Deactivated relay 139 opens the normally closed switch 142, thereby disconnecting the frequency signal from the R.F. averaging buss 36. Simultaneously, relay coil 140 operates selector switch 143 to disconnect the master buss 109 and the slave buss 110 from the resistor 63 of the error phase detector 51 and connect the resistor 63 to ground 38. Also, each deactivated relay coil 141 operates one of the associated switches 111–114 to interrupt the ground path of the slave buss 110 through the control module of the malfunctioning frequency source and activates an alarm circuit 151 by grounding the alarm buss 152 at one of the terminals 153, 154, 155 or 156. The alarm circuit 151 can be any of the common alarms, such as a lamp or a relay for remote alarm indication.

The malfunctioning frequency sources will remain disconnected from the system as long as they continue to malfunction. If the malfunction is corrected, the malfunction signal will no longer be present at the input terminal of the "OR" gate 131. After twelve seconds the relays 139–141 will no longer be deactivated. Hence, the previously malfunctioning frequency source will be reconnected automatically to the system. Furthermore, by providing the automatic connect and disconnect feature, the quality standard of the system is enhanced since the possibility of error due to system malfunction is minimized and the system will operate uninterruptedly as long as one frequency source continues to function. The malfunction system forms part of the subject claimed in my above identified copending application S.N. 603,564.

While the present invention has been described in detail with respect to a single embodiment, it will be apparent that numerous modifications and variations are possible within the scope of the invention. Hence, the present invention is not to be limited except by the terms of the following claims.

What is claimed is:

1. Apparatus for generating a signal at a precisely selected frequency comprising a plurality of frequency sources each providing a signal at a selected frequency; averaging means coupled to receive the signals provided by said frequency sources and provide an output signal at the average frequency of said signals; comparator means coupled to compare the source signals with a signal representative of the average frequency of said source signals and provide primary error signals representative of the deviation of the frequency of each of said sources signals from the frequency of said output signal; at least a first error signal averaging means for receiving selected primary error signals generated by said comparator means and providing an average of the primary error signals coupled thereto; an error signal comparator means coupled to compare the average error signal and the primary error signals coupled to the first error signal averaging means and provide master error signals representative of the difference between the average error signal and each of the primary error signals coupled to said first error signal averaging means; and means for selectively coupling each of said primary error signals to one of the first error signal averaging means and the frequency sources and for coupling said master error signals to the frequency sources, said error signals coupled to said frequency sources to adjust the frequencies of the source signals to the frequency of the output signal.

2. The apparatus according to claim 1 wherein said plurality of frequency sources include precise atomically stabilized and less precise frequency sources, and said error signals representative of the deviations of the frequencies of each of the signals provided by said precise atomically stabilized frequency sources from the frequency of said output signal are coupled to said error signal averaging means.

3. The apparatus according to claim 2 further comprising a second error signal averaging means for receiving selected primary error signals generated by said comparator means and providing an average of the primary error signals coupled thereto, said first error signal averaging means receiving the primary error signals provided for adjusting the precise frequency sources, said second error signal averaging means receiving the primary error signals provided for adjusting the less precise frequency sources; and wherein said error signal comparator means is coupled to compare the average error signals provided by said second error signal averaging means and the primary error signals coupled to the second error signal averaging means and provide slave error signals representative of the difference between the average of and each of the primary error signals coupled to the second error signal averaging means; and said means for selectively coupling the error signals selectively couples each of said primary error signals to one of said first error signal averaging means, said second error signal averaging means and the frequency sources and couples said master error signals and slave error signals to the frequency sources.

4. The apparatus according to claim 3 further comprising means for selectively coupling one of said error signal averaging means to said error signal comparator means, said means for selectively coupling said error signal averaging means operative to disconnect said first error signal averaging means from and couple said second error signal averaging means to said error signal comparator when said primary error signals are disconnected from said first error signal averaging means, and wherein said means for selectively coupling the error signals couples said primary error signals representative of the deviations of the frequencies of the precise source signals from the frequency of said output signal to said first error signal averaging means, selectively couples said primary error signals representative of the deviations of the frequencies of the less precise source signals from the frequency of said output signal to the less precise frequency sources and the second error signal averaging means, and couples said master error signals to said precise frequency sources while disconnecting said primary error signals therefrom and said slave error signals to said less precise frequency sources while disconnecting said primary error signals therefrom.

5. The apparatus according to claim 4 wherein said means for selectively coupling the error signals operative to couple said primary error signals representative of the deviations of the frequencies of the less precise source signals from the frequency of said output signal to the less precise frequency sources as long as said means for selectively coupling the primary error signals is operative to couple one of said error signals to said first error signal averaging means and to the second error signal averaging means when said means for selectively coupling the error signals is operative to disconnect all of said primary error signals from said first error signal averaging means.

6. The apparatus according to claim 1 wherein said frequency sources are fashioned to provide signals of identical frequencies and amplitudes; said averaging means includes means to detect the instantaneous amplitude of said source signals, and means responsive to the amplitude detection means to provide a signal representative of the instantaneous amplitude of said source signals and thereby the average phase and average frequency of the phases and frequencies of said source signals.

7. The apparatus according to claim 6 wherein said comparator means includes a phase detector means coupled to compare the phase of each of the source signals with the signal of average phase and frequency.

8. The apparatus according to claim 7 wherein said averaging means includes a plurality of identical input resistors one of each coupled at one end thereof to receive the signal of one of said frequency sources, and a common resistor connected to the remaining ends of said plurality of input resistors to develop said signal equal to the instantaneous amplitude of the source signals.

9. The apparatus according to claim 1 further comprising means to transform the frequency of said frequency signals issuing from each frequency source in response to said error signals to a frequency equal to the frequency of said output signal.

10. The apparatus according to claim 1 further comprising a second error signal averaging means for receiving selected primary error signals generated by said comparator means and providing an average of the primary error signals coupled thereto; and wherein said error signal comparator means is coupled to compare the average error signals provided by said second error signal averaging means and the primary error signals coupled to the second error signal averaging means and provide slave error signals representative of the difference between the average of and each of the primary error signals coupled to the second error signal averaging means; and said means for selectively coupling the error signals couples each of said primary error signals selectively to one of said first error signal averaging means, said second error signal averaging means and the frequency sources and couples said master error signals and said slave error signals to the frequency sources.

No references cited.

ROY LAKE, *Primary Examiner.*

S. GRIMM, *Assistant Examiner.*